United States Patent
Kanda

[11] Patent Number: 6,038,499
[45] Date of Patent: Mar. 14, 2000

[54] DIRECTION DETECTING DEVICE FOR DETECTING DIRECTION OF SPACE VEHICLE

[75] Inventor: Seiji Kanda, Tokyo, Japan

[73] Assignee: Kabushiki Kaisha Toshiba, Kawasaki, Japan

[21] Appl. No.: 08/987,606

[22] Filed: Dec. 9, 1997

[30] Foreign Application Priority Data

Dec. 10, 1996 [JP] Japan .................................. 8-329535

[51] Int. Cl.[7] ...................................................... B64G 3/00
[52] U.S. Cl. ........................ 701/13; 701/226; 244/158 R
[58] Field of Search ............................. 701/13, 226, 300; 244/158 R, 161; 359/109, 113, 154, 170

[56] References Cited

U.S. PATENT DOCUMENTS

| | | | |
|---|---|---|---|
| 5,109,345 | 4/1992 | Dabney et al. ......................... | 701/226 |
| 5,132,910 | 7/1992 | Scheit et al. ........................... | 701/226 |
| 5,221,985 | 6/1993 | Ito ......................................... | 359/154 |
| 5,436,841 | 7/1995 | Ferro ..................................... | 701/226 |
| 5,899,945 | 5/1999 | Baylocq et al. ........................ | 701/13 |

*Primary Examiner*—Gary Chin
*Attorney, Agent, or Firm*—Oblon, Spivak, McClelland, Maier & Neustadt, P.C.

[57] ABSTRACT

In a direction detecting device, a laser beam emitting source for intermittently emitting a laser beam is provided in one satellite, image data including a laser beam image in emitting and non-emitting states of the laser beam from the laser beam emitting source is obtained by an optical system and an image pickup section provided in the other satellite, image data of the laser beam non-emitting state is stored in a memory section, stored image data of the laser beam non-emitting state and image data of the laser beam emitting state are subtracted to extract only a laser beam image, thereby detecting a direction of the laser beam emitting source based on the extracted laser beam image.

4 Claims, 1 Drawing Sheet

DIRECTION DETECTING DEVICE FOR DETECTING DIRECTION OF SPACE VEHICLE

BACKGROUND OF THE INVENTION

The present invention relates to a direction detecting device used to detect a direction of other space vehicle from a space vehicle such as a satellite launched into space.

In the field of the space development, an optical communication system using a space propagation is structured in the satellite launched into space is considered and developed in recent years. Such an optical communication system of a space propagation system is characterized in that optical communication can be performed with simple facilities as compared with the optical communication system of an optical fiber system using an optical fiber as a transmission line.

In this kind of the optical communication system of the space propagation system, unlike the optical fiber system, by use of the space propagation, a base station transmits communication light a communication counterpart station and receives communication light from the communication counterpart station, thereby the optical communication is performed. As a result, it is required that a special structure such as a tracking function of the communication counterpart station (satellite of communication counterpart) be provided.

Specifically, there is a direction detecting device for detecting the direction (azimuth, angle of elevation) of the communication counterpart station to correctly send communication light to the communication counterpart.

Such a direction detecting device must correctly and surely detect the direction of the space vehicle to contribute to the optical communication having high reliability and high accuracy.

BRIEF SUMMARY OF THE INVENTION

An object of the present invention is to provide a direction detecting device, which can correctly and surely detect a direction of space vehicles with a simple structure.

To attain the above object, there can be provided to a direction detecting device comprising:

first and second space vehicles moving in space;

a laser beam emitting source, mounted on the first space vehicle, for intermittently emitting a laser beam to space;

image data generating means, mounted on the second space vehicle, for obtaining an optical image including the laser beam from the laser beam emitting means to generate image data;

storing means for storing image data of a laser beam emitting state of image data generated by the image data generating means;

laser beam image extracting means for subtracting image data of a laser beam non-emitting state and image data of the laser beam emitting state stored in the storing means to extract a laser beam image; and direction detecting means for detecting a direction of the laser beam emitting source based on the laser beam image extracted by the laser beam image extracting means.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will now be described with reference to the accompanying drawings.

Figure 1:
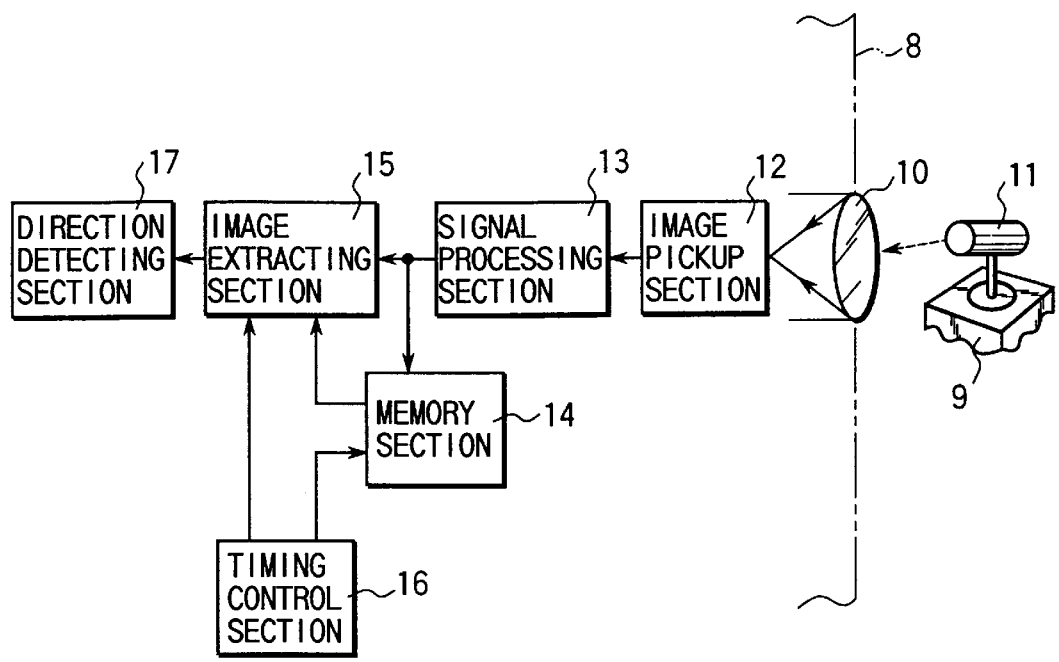
FIG. 1 is a block diagram showing the structure of a direction detecting device according to an embodiment of the present invention.
Figure 2:
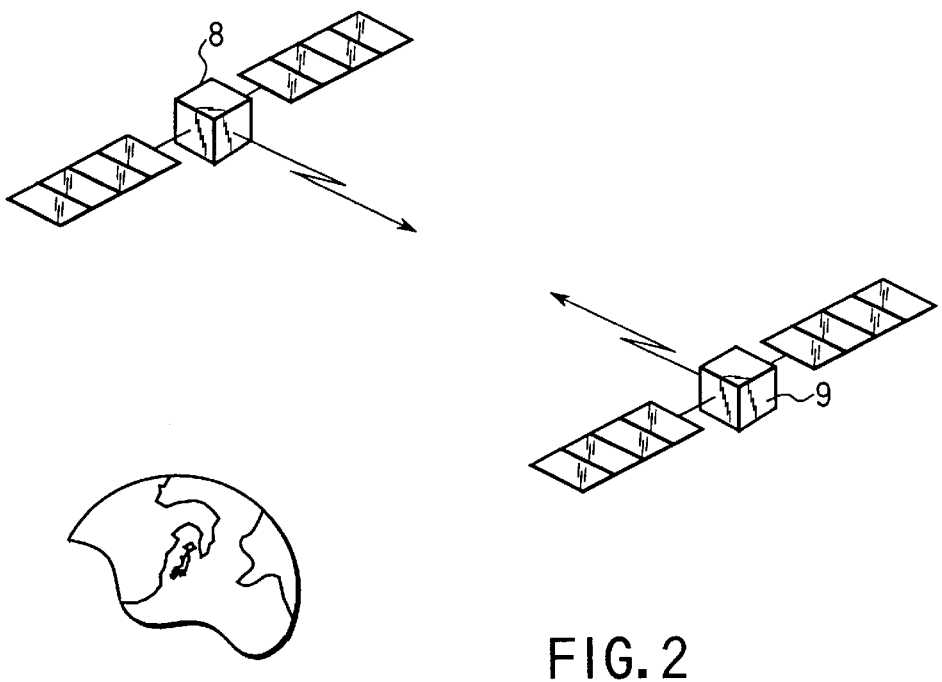
FIG. 2 is a perspective view showing the outline of an optical communication system to which the present invention is applied.

FIG. 1 shows a direction detecting device according to one embodiment of the present invention. Direction data (azimuth, angle of elevation) between satellites 8 and 9, which are launched to space as shown in FIG. 2. Then, direction data detected by the direction detecting device is provided as a communication direction of an optical communication system, which is constructed between satellites 8 and 9, so that a predetermined optical communication network is formed.

As an optical communication system constructed in space, an optical communication device, which executes an optical communication, is mounted on each of the satellites, and the optical communication network is formed based on direction data detected by the direction detection device so that the optical communication is executed.

Next, the following will explain the direction detecting device of the present invention.

Specifically, one satellite 8 has an optical system 10, which constitutes an optical antenna. The other satellite 9 has a laser beam generation source 11 to correspond to the optical system 10 of the satellite 8.

The laser beam generation source 11 is controlled to be switched to a laser beam emitting state and a laser beam non-emitting state, so that the laser beam for a predetermined time interval by a drive control section (not shown). In other words, the laser beam is intermittently emitted to the optical system 10.

An image pickup section 12, which is formed of a solid image pickup element (CCD), is provided at a focal position of the optical system 10. Thereby, an optical image including the laser beam is converged to be image-formed onto the image pickup section 12. A signal processing section 13 is connected to an output terminal of the image pickup section 12. The image pickup section 12 converts the optical image to an electrical signal, thereby generating an image signal. The image signal is output to the signal processing section 13. The signal processing section 13 processes the input image signal to generate image data.

A memory section 14 is connected to an output terminal of the signal processing section 13, and one input terminal of an image extracting section 15 is connected to an output terminal of the memory section 14. Then, the output terminal of the signal processing section 13 is connected to the other input terminal of the image extracting section 15.

A timing control section 16 is connected to each signal input terminal of each of the image extracting section 15 and the memory section 14. The timing control section 16 outputs a control signal to the image extracting section 15 and the memory section 14. Among image data, which is generated by the signal processing section 13 in response to the laser beam emitting operation of the laser beam emitting source 11, image data of the laser beam non-emitting state is fetched and stored into the memory section 14. Sequentially, the timing control section 16 controls the memory section 14 to output image data, which is stored in the memory section 14 in response to the acquisition of the image data of the laser beam emitting state, to the image extracting section 15.

Moreover, the timing control section 16 outputs a timing control signal to the image extracting section 15 in response to the laser beam generation of the laser beam emitting source 11. Thereby, the image extracting section 15 is controlled to fetch the image data of the laser beam emitting state of image data generated by the signal processing section 13.

A direction detecting section 17 is connected to the image extracting section 15. The image extracting section 15 subtracts each of image data of the laser beam emitting state and the laser beam non-emitting state to remove noise other than the laser beam image from image data. As a result, only the laser beam image is extracted to be output to the direction detecting section 17. The direction detecting section 17 calculates the direction (azimuth, angle of elevation) of the laser beam emitting source 11, that is, the satellite 9 based on the input laser beam image.

According to the above-mentioned structure, for detecting the direction between the satellites 8 and 9, the laser beam emitting source 11 of the satellite is controlled to be switched to the emitting and non-emitting states for a predetermined time interval, so that the laser beam is intermittently emitted to the satellite 8. Thereby, the optical image including the laser beam is input to the optical system 10 of the satellite 8, and the optical image is image-formed onto the image pickup 12.

The image pickup section 12 converts the optical image to the electrical signal, thereby generating the image signal. The image signal is output to the signal processing section 13. The signal processing section 13 processes the input image signal to generate image data. The timing control section 16 outputs the control signal to the image extracting section 15 and the memory section 14. Among image data, which is generated by the signal processing section 13 in response to the laser beam emitting operation of the laser beam emitting source 11, image data of the laser beam non-emitting state is fetched and stored into the memory section 14. Then, the timing control section 16 controls the memory section 14 to output image data, which is stored in the memory section 14 in response to the acquisition of the image data of the laser beam emitting state, to the image extracting section 15.

Also, the timing control section 16 outputs the timing control signal to the image extracting section 15 in response to the laser beam generation of the laser beam emitting source 11. Thereby, the image extracting section 15 is controlled to fetch the image data of the laser beam emitting state of image data generated by the signal processing section 13.

At this time, the image extracting section 15 subtracts each of image data of the laser beam emitting state and the laser beam non-emitting state to remove noise other than the laser beam image from image data. As a result, only the laser beam image is extracted to be output to the direction detecting section 17. The direction detecting section 17 calculates the direction (azimuth, angle of elevation) of the satellite 9 based on the input laser beam image, so that the direction between the satellites 8 and 9. Then, the optical communication between the satellites 8 and 9 is executed by use of space propagation based on direction data calculated by the direction detecting section 17.

Thus, in the direction detecting device, the laser beam emitting source 11, which intermittently generates the laser beam, is provided in the satellite 9. Then, image data, which includes the laser beam image in the laser beam emitting and non-emitting states from the laser beam emitting source 11, is obtained by the optical system 10 and the image pickup section 12. Image data of the laser beam non-emitting state is stored in the memory section 14, and the subtraction between the stored image data of the laser beam non-emitting state and image data of the laser beam emitting state is executed by the image extracting section 15. As a result, only the laser beam image is extracted from image data, and the direction of the laser beam emitting source 11 is detected based on the extracted laser beam image.

According to the above-mentioned embodiment, the direction of the laser beam emitting source 11 can be detected based on only the laser beam image in which noise is removed, and the direction of the satellite 9 can be detected with high accuracy. The direction between the satellites 8 and 9 can be detected based on direction data. Thereby, highly accurate optical communication using space propagation between the satellites 8 and 9 is executed.

The above embodiment explained the case in which direction data calculated by the direction detecting section 17 was applied to the optical communication system constructed between the satellites 8 and 9. However, the present invention is not limited to the above case. For example, the present invention can be applied to a case in which the direction between the space vehicles is detected to execute a rendezvous docking of the space vehicles including the satellites. Thereby, substantially the same technical advantage as the above-explained case can be expected.

As space vehicles, various kinds of space vehicles including a planet landing machine and a space operation machine can be used.

Moreover, the above embodiment explained the case in which image data of the laser beam non-emitting state was stored in the memory section 14 and the laser beam image was generated based on image data of the laser beam non-emitting state. However, the present invention is not limited to this embodiment. The present invention can be applied to a case in which image data of the laser beam emitting state is stored in the memory section 14 and the laser beam image can be generated based on image data of the laser beam emitting state. Thereby, substantially the same technical advantage as the above-explained case can be expected.

Additional advantages and modifications will readily occur to those skilled in the art. Therefore, the invention in its broader aspect is not limited to the specific details and the representative device shown and described herein. Accordingly, various modifications may be made without departing from the spirit or scope of the general inventive concept as defined by the appended claims and their equivalents.

I claim:

1. A direction detecting device comprising:

first and second space vehicles moving in space;

a laser beam emitting source, mounted on said first space vehicle, for intermittently emitting a laser beam to space;

image data generating means, mounted on said second space vehicle, for obtaining an optical image including the laser beam from said laser beam emitting means to generate image data;

storing means for storing image data of a laser beam emitting state of image data generated by said image data generating means;

laser beam image extracting means for subtracting image data of a laser beam non-emitting state from said image data of the laser beam emitting state stored in said storing means to extract a laser beam image; and direction detecting means for detecting a direction of said laser beam emitting source based on the laser beam image extracted by said laser beam image extracting means.

2. The device according to claim 1, wherein said first and second space vehicles execute an optical communication based on direction data detected by the direction detecting means.

3. A direction detecting device comprising:

a laser beam emitting source, mounted on space vehicle to be detected, for intermittently emitting a laser beam to space;

image data generating means for obtaining an optical image including the laser beam from said laser beam emitting means to generate image data;

storing means for storing image data of a laser beam non-emitting state of image data generated by said image data generating means;

laser beam image extracting means for subtracting image data of a laser beam emitting state from said image data of the laser beam non-emitting state stored in said storing means to extract a laser beam image; and direction detecting means for detecting a direction of said laser beam emitting source based on the laser beam image extracted by said laser beam image extracting means.

4. The device according to claim 3, wherein said space vehicle executes an optical communication based on direction data detected by the direction detecting means.

* * * * *